United States Patent [19]
Ross et al.

[11] Patent Number: 5,772,355
[45] Date of Patent: Jun. 30, 1998

[54] QUICK ATTACH/RELEASE ADAPTER MECHANISM

[75] Inventors: Robert N. Ross, Fitchburg; Michael P. Clark, Lunenburg; Randall J. Deary, Littleton, all of Mass.

[73] Assignee: Precision Optics Corporation, Gardner, Mass.

[21] Appl. No.: 769,954

[22] Filed: Dec. 19, 1996

[51] Int. Cl.⁶ .................................................. B25G 3/00
[52] U.S. Cl. .......................... 403/322; 403/321; 403/155; 403/154; 359/818
[58] Field of Search ...................... 403/355, 376, 403/378, DIG. 7, 324, 321, 294, 155, 154, 322; 359/827, 818

[56] References Cited

U.S. PATENT DOCUMENTS

| | | |
|---|---|---|
| 2,032,866 | 3/1936 | Black .......................................... 359/827 |
| 3,070,389 | 12/1962 | Baur et al. . |
| 3,477,777 | 11/1969 | Grosjean . |
| 4,066,330 | 1/1978 | Jones . |
| 4,281,895 | 8/1981 | Mohr . |
| 4,305,386 | 12/1981 | Tawara . |
| 4,318,395 | 3/1982 | Tawara . |
| 4,533,212 | 8/1985 | Shimizu . |
| 4,740,058 | 4/1988 | Hori et al. . |
| 5,054,886 | 10/1991 | Ozaki et al. ......................... 359/827 X |
| 5,406,418 | 4/1995 | Deary . |
| 5,617,257 | 4/1997 | Sheehy et al. ....................... 359/827 X |

*Primary Examiner*—Kenneth J. Dorner
*Assistant Examiner*—William L. Miller
*Attorney, Agent, or Firm*—Pearson & Pearson

[57] ABSTRACT

An eyepiece adapter mechanism for providing a quick positive engagement to an interfacing instrument such as a B-styled endoscope. The adapter mechanism comprises a rigid back plate for providing a permanent attachment for the mechanism. A C-clip retainer positioned within a circumferential chamber of the back plate acts as a locking ring under the elastic force of the C-clip material itself to provide a grip around the interfacing instrument when installed into the back plate. An outwardly protruding portion of the C-clip, acting as a lever, releases the interfacing instrument when the level is moved toward a fixed post located a predetermined distance from the lever to facilitate single handed operation. An alternate embodiment provides a quick attach/release adapter without an eyepiece and employing a C-clip retainer.

12 Claims, 4 Drawing Sheets

QUICK ATTACH/RELEASE ADAPTER MECHANISM

BACKGROUND OF THE INVENTION

1. Field of the Invention

This invention generally relates to an adapter for an optical instrument and in particular to an adapter that provides for a quick attachment and release of an eyepiece from a B-mount instrument.

2. Description of Related Art

Eyepieces are associated with a number of optical devices including, as examples, endoscopes and boroscopes. The term "endoscope" generally denotes a class of optical devices used for examining the internal cavities of the human body. The term "borescope" generally denotes a class of analogous devices for examining internal cavities in machinery or other nonhuman areas. Endoscopes and horoscopes, have the same basic structure. Each contains an objective lens for gathering an image, one or more intermediate relay lenses or fiber optics for relaying the image through an elongated tube and eyepiece optics for allowing an individual to view the image directly.

The eyepiece optics in endoscopes and boroscopes generally have a similar basic construction. Typically eyepiece optics include an eyepiece housing with a central cavity for any optical elements required by the eyepiece. Externally the eyepiece housing has a neck portion for attachment to an elongated tube from the endoscope or borescope. A frustoconical or other conoidally-shaped housing section then flares from its distal end to a proximal end and terminates at a cylindrical peripheral flange portion. During direct viewing, an individual places his or her eye at this peripheral flange portion, that may or may not contain a viewing window.

Eyepieces differ by having diverse diameters and by having specially shaped conoidal or flared housing surfaces. These differences may result from requirements of the optical elements contained in the eyepiece or merely from an aesthetic design consideration. Even frusto-conical or flared housing sections of different eyepiece housings may vary for a given diameter eyepiece among eyepieces supplied by different manufacturers.

In many applications it is highly desirable to connect another device to the eyepiece. These devices may include photographic or television cameras or beam splitters for permitting two or more individuals to view an image simultaneously or to allow one individual to view the image directly while a television camera records the image simultaneously. Sometimes an individual has a preference for an eyepiece of a particular size that differs from the size of the eyepiece associated with the endoscope, borescope or the like. In both situations it is desirable to have an adapter that will attach the eyepiece of the desired size or a coupler that will attach a diverse optical device to an eyepiece associated with the endoscope or borescope. In the following discussion the term "coupler" is meant to include any such coupling devices or adapters.

Several couplers have been proposed for mechanically coupling an optical device to an eyepiece including those disclosed in the following U.S. Pat. Nos.:
U.S. Pat. No. 4,066,330 (1978) Jones
U.S. Pat. No. 4,305,386 (1981) Tawara
U.S. Pat. No. 4,318,395 (1982) Tawara
U.S. Pat. No. 4,740,058 (1988) Hori The Jones patent discloses an endoscope eyepiece with an opto-mechanical coupler. A spring-biased cam ring mounted on the coupler rotates to retract retaining studs and integral heads radially outward. When the studs are retracted the eyepiece can pass between the heads for connection to or separation from the eyepiece. When the cam ring is released, a spring biases it to a stable position and thereby moves the studs radially inward until the heads engage the flared surface of the eyepiece housing. This action clamps the eyepiece to and centers the eyepiece on the coupler.

The Tawara patent ('386) discloses an endoscope accessory mounting device, or coupler, with a spring-biased cam ring that controls the position of axially aligned, radially extending plate cams. When the cam ring is rotated, the eyepiece can freely pass into or separate from an eyepiece receiving socket in the accessory mounting device. When the eyepiece is located in the socket and the cam ring is released, springs displace the cam ring to its stable position and the cam plates rotate into engagement with the flared surface of the eyepiece thereby to clamp and center the accessory mounting device with respect to the eyepiece.

The Tawara patent ('395) also discloses an endoscope coupler with spring-biased axially aligned cam plates that are biased against a radially acting spring biased plunger. In this coupler the eyepiece snaps into the coupler by driving the cam plates away from a central axis and compressing the springs on the cam plates. When the eyepiece seats in a socket, the springs drive the cam plates against the flared surface of the eyepiece to clamp and center the coupler with respect to the eyepiece. An individual compresses the radially acting, diametrically opposed plungers to move the cam plates to an open position when it is desired to separate the coupler from the eyepiece.

The Hori patent ('058) discloses an optical mechanical coupler with a C-shaped clamping member that is axially displaced from a clamping surface and operated by a locking ring or clamp member. When the clamp member rotates to one extreme position it axially displaces the C-shaped clamping member from the clamping surface. An eyepiece can then be inserted from the side. A reverse rotation of the clamp member displaces the C-shaped clamping member into the eyepiece thereby to clamp and center the coupler with respect to the eyepiece.

Over the years the use of these and other mechanical couplers for eyepieces have led to the establishment of a number of desirable coupler criteria. Specifically, the attachment and separation processes must be simple and be capable of being performed with one hand. It should be possible to rotate the coupler with respect to the eyepiece. The coupler must be easy to clean and, in the case of endoscopes, be easy during use to sterilize. It must be inexpensive to produce, and reliable in use. Further, it should be possible to attach a single coupler to eyepieces of a given nominal diameter having diverse cross-sections or forms through the flared housing portions.

Prior art couplers have exhibited some of these criteria, but not all of them. For example, The Tawara patent ('395) coupler enables one-handed operation. The Jones and Tawara patents permit rotation between the eyepiece and the coupler. However, each of the above-described structures requires the assembly of a large number of components in the form of cam plate studs, springs, rotatable control members, plungers and other elements. These structures are complicated, increase the manufacturing complexity and are subject to failure when debris accumulates in the operative mechanism during normal use, particularly in medical applications. Such couplers can not readily be repaired on site. A customer must maintain an inventory of such couplers or must be capable of operating whenever one of these couplers is at the factory for repair. With particular respect to endoscopes, the sterilization process is complicated because the mechanisms can trap solution making it difficult to assure that all the sterilization solution has been evaporated or removed. Thus none of these couplers exhibit all the desirable criteria. Moreover, none of these couplers incorporate a simple, reliable structure.

SUMMARY

Accordingly, it is therefore an object of this invention to provide a simple, low cost adapter mechanism for quickly attaching and releasing an interfacing instrument to and from a device.

It is another object of this invention to provide a minimum parts, light weight, low profile adapter mechanism.

It is a further object of this invention to provide an adapter mechanism requiring operation by only a single hand to open the mechanism in order to attach or release an interfacing instrument.

It is yet another object of this invention for the retaining means of the adapter mechanism to provide equal pressure around the circumference of the interfacing instrument.

These and other objects are accomplished by providing an adapter mechanism for enabling an image transmitted along an optical axis from a first device to be received by a second device, the adapter mechanism comprising back plate means having a first end portion secured to the second device and a second end portion spaced along an adapter mechanism axis for attaching to the first device, the back plate means including at the second end portion a radially extending cylindrical chamber, retaining means positioned within the cylindrical chamber for securing the first device within the back plate means, and the retaining means having a lever means extending through an outer wall of the cylindrical chamber for enabling the first device to be released from the adapter mechanism. The retaining means comprises a circular ring having the lever means at a first end and a hook means at a second end for securing the retaining means within the cylindrical chamber. The retaining means comprises a C-clip means having a chamfered edge means for enabling the first device to snap into the adapter mechanism. The cylindrical chamber means comprises a guide post and the retainer means comprises an elongated slot for receiving the guide post into the slot, thereby limiting the radial movement of the retaining means as the lever means is moved in a direction to release the first device. The back plate means comprises a rear section having a radially extending cylindrical section of lesser radial distance than the cylindrical chamber means, the rear section having a fixed post protruding away from the cylindrical section and positioned a predetermined distance from the lever means to enable the first device to be quickly released from the adapter mechanism using the fingers of one hand. The C-clip means extends through an arc of approximately 350 degrees. The retainer means comprises material means for providing an elastic force to grip an interfacing device inserted in the adapter mechanism. The retainer means comprises acetal compounds such as delrin material. The second end portion comprises a rear section having an opening for attaching to the second device and enabling passage of the image. The rear section of the end portion comprises a plurality of holes surrounding the opening for air venting.

The objects are further accomplished by providing a method of attaching a first device to a second device with a quick attach/release mechanism for enabling an image transmitted from the first device along an optical axis to the second device, comprising the steps of securing a first end portion of a back plate means of the quick/attach release mechanism to the second device and a second end portion spaced along an adapter axis to the first device, providing at the second end portion of the back plate means a radially extending cylindrical chamber means for receiving the first device, securing the eyepiece within is the back plate means with retaining means positioned within the cylindrical chamber means, and providing a lever means extending through the cylindrical chamber means to enable the first device to be quickly released from the mechanism. The step of the retaining means being positioned within the cylindrical chamber means comprises the step of providing a C-clip having the lever means at a first end of the C-clip and a hook means at a second end of the C-clip. The step of providing the C-clip further comprises the step of providing a chamfered edge on the C-clip for enabling the first device to snap into the adapter mechanism.

The objects are further accomplished by providing a quick release adapter mechanism for interfacing a first device to a second device comprising a first section of the adapter mechanism having an inner axially extending cylindrical wall including threaded means on an upper portion of the wall for attachment to a first device, the cylindrical wall comprises a first portion having a larger outer diameter wall than a second portion, seal means positioned around the circumference of the second portion of the cylindrical wall and adjacent to an end of the larger diameter first portion for providing a tight fit between the first section and the second section of the adapter mechanism, the second portion of the inner cylindrical wall of the first section comprises a groove around the outer circumference of the second portion for receiving the second section of the adapter mechanism, the second section comprises an upper portion having a C-clip means for insertion into the groove of the second portion of the first section securing the second section to the first section, the second section comprises a lower portion having a first threaded cylindrical wall with the same diameter as the first section cylindrical wall, and the C-clip means comprises a lever protruding through the cylindrical wall for releasing the C-clip from the groove of the second portion of the first section. The cylindrical wall of the first section comprises an outer chamfered edge at a lower end adjacent to the groove for enabling the first section to snap into the second section. The seal means comprises an O-ring. The C-clip means comprises a chamfered edge for enabling the C-clip to snap into the groove around the circumference of the second portion of the first section. The C-clip comprises material means for providing an elastic force to grip the groove. The second section of the adapter mechanism comprises a transition area between the outer cylindrical upper portion and the outer cylindrical lower portion, the cylindrical upper portion being of greater outside diameter than the cylindrical lower portion, the transition area comprises a plurality of equal holes for providing air venting.

The objects are further accomplished by a method for interfacing a first device to a second device comprising a quick release adapter mechanism comprising the steps of attaching a first section of the adapter mechanism, having an inner axially extending cylindrical wall including threaded means on an upper portion of the wall, to a first device, providing the cylindrical wall with a first portion having a larger outer diameter wall than a second portion, positioning a seal means around the circumference of the second portion of the cylindrical wall and adjacent to an end of the larger diameter first portion thereby providing a tight fit between the first section and the second section of the adapter mechanism, providing a groove around the outer circumference of the second portion of the inner cylindrical wall of the first section for receiving the second section of the adapter mechanism, inserting a C-clip means of an upper portion of the second section into the groove of the second portion of the first section thereby securing the second section to the first section, providing in a lower portion of the second section a first threaded inner cylindrical wall with the same diameter as the first section inner cylindrical wall, and providing a lever on an end of the C-clip means protruding through the cylindrical wall for releasing the C-clip from the groove of the second portion of the first section. The method comprises the step of providing on the cylindrical wall of the first section an outer chamfered edge at a lower end adjacent to the groove for enabling the first section to snap into the section. The step of positioning the seal means around the circumference of the cylindrical wall includes the step of positioning an O-ring for the seal means. The step of inserting the C-clip means comprises the steps of providing a chamfered edge on the C-clip means for enabling the C-clip to snap into the groove around the circumference of the second portion of the first section. The method further comprises the step of providing a transition area on the second section of the adapter mechanism between the outer cylindrical upper portion and the outer cylindrical lower portion, the cylindrical upper portion being of greater outside diameter than the cylindrical lower portion, the transition area having a plurality of equal by spaced holes for providing air venting.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
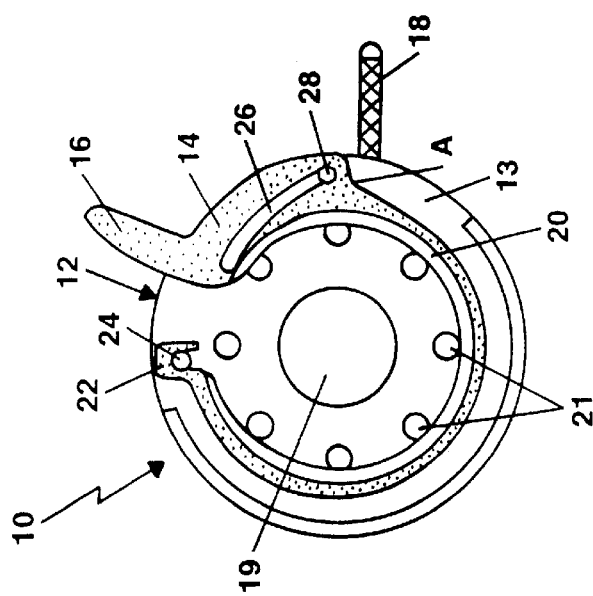
FIG. 1 is an elevational end view of the invention of the quick attach/release adapter mechanism having a portion of the circular outer wall cut away exposing a C-clip retainer.

Referring to FIG. 1, an elevational end view of the invention of a quick attach/release adapter mechanism 10 is shown comprising a rigid back plate 12 and a C-clip retainer 14 with a portion of the chamber 17 and wall 13 of the back plate 12 cut away exposing the C-clip retainer 14 starting at point A. The back plate 12 provides for permanent attachment of the adapter mechanism to a suitable device. The C-clip retainer 14 is positioned within a circumferential chamber 17 (see FIG. 4) of the back plate 12 and acts as a locking ring under the elastic force of the C-clip retainer 14 material to provide a grip around an interfacing instrument when installed within the adapter mechanism 10. One end of the C-clip retainer 14 extends as a lever 16 through an opening in the top of chamber 17 of the back plate 12. This simplified mechanism 10 comprising two basic elements of the back plate 12 and the C-clip 14, results in the elimination of springs, bushings, screws, etc. that have been traditionally used for a retaining mechanism.

Figure 3:
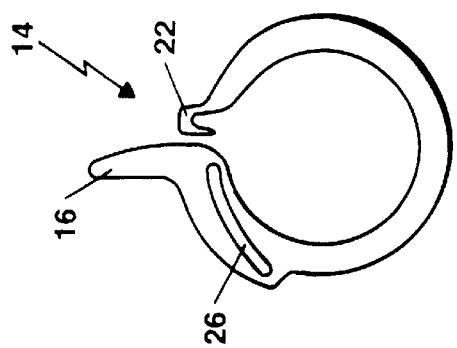
FIG. 3 is a rear view of the C-clip retainer.
Figure 2:
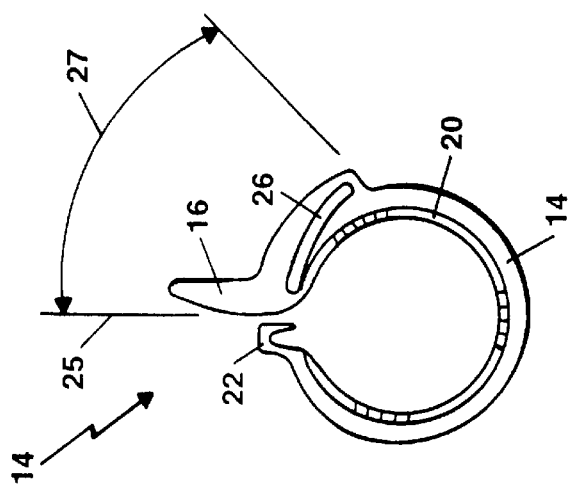
FIG. 2 is a front view of a C-clip retainer.

Referring now to FIG. 1, FIG. 2 and FIG. 3, a front elevational view of the C-clip retainer 14 is shown in FIG. 2. The C-clip retainer 14 covers approximately 350 degrees in circumference starting with a lever 16 at one end and ending with a hook 22 at the other end. Based on its actual shape, it may be considered an exaggerated "C" shape. A 45 degree chamfer 20 is provided on the inner front edge of the C-clip retainer 14. An elongated slot 26 is provided in the retainer 14 below the lever 16 where the retainer 14 circumference is wider for approximately 57 degrees from a vertical line 25 adjacent to the lever 16 as indicated by reference 27 in FIG. 2; the slot 26 is approximately 0.063 inches wide and 0.75 inches long having a slight arc. A guide post 28 located within the back plate chamber 17 fits into the slot 26 to guide the C-clip retainer 14 as the lever 16 is moved toward the guide post 28 causing the C-clip retainer 14 to move outwardly within the chamber 17 of the back plate 12. The hook 22 end of the C-clip retainer 14 is placed over a fixed post 24 and secures the C-clip retainer 14 at a fixed point so that it will move outwardly within the chamber 17 when the lever 16 is moved. A rear view of the C-clip retainer 14 is shown in FIG. 3. The depth of the retainer 14 is approximately 0.110 inches. The present embodiment of retainer 14 is made of an acetal compound such as marketed under the name Delrin® which is well known in the art; it may also be made from various moldable or machineable materials of plastics having similar properties.

Figure 4:
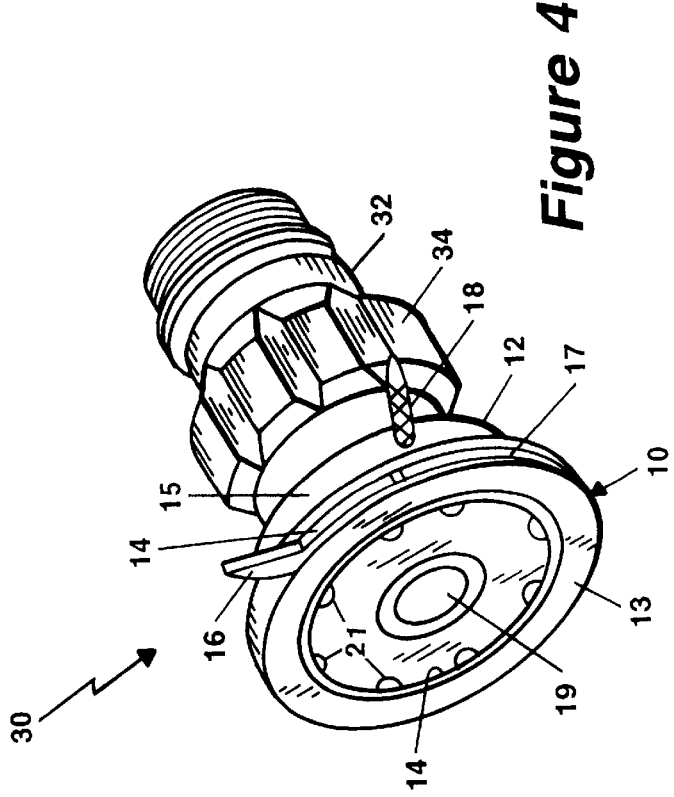
FIG. 4 is an isometric view of the quick attach/release apparatus mechanism attached to an eye piece.
Figure 7:
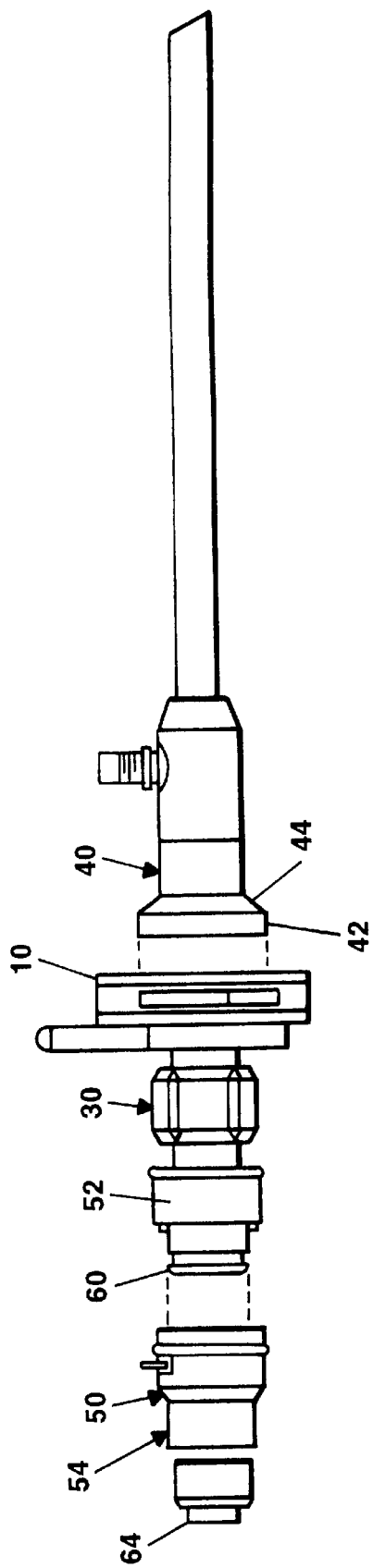
FIG. 7 is a perspective view of an upper sect ion of the alternate embodiment of a quick attach/release apparatus showing the threaded cylinder near the top of the inside cylinder walls.

Referring now to FIG. 4, an isometric view of an eyepiece 30 having the quick attach/release adapter mechanism 10 attached to one end of an imaging coupler 32. A knurled knob 34 is positioned around the circumference of the imaging coupler 32 for focusing purposes. A fixed post 18 protruding outwardly from the back plate 12 is positioned a predetermined distance (approximately one inch) from the lever 16 portion of the C-clip 14. This distance is selected to facilitate using the fingers of one hand to operate the adapter mechanism 10, move the lever 16 toward the fixed post 18 which enables an interfacing instrument to be attached to or released from the adapter mechanism 10 such as an endoscope 40 as shown in FIG. 7. The end 42 of the endoscope 40 may be placed into the adapter mechanism 10 when the lever 16 is moved toward the fixed post 18, and when the lever 16 is released, the C-clip retainer 14 ring grips around a truncated conical back surface 44 of the end 42 of the endoscope 40 applying equal pressure around the circumference of the endoscope 40, thereby holding and properly positioning the endoscope 40, in front of the eyepiece 30. Because of the conical or radius common on the interfacing instrument such as B-mount eyepieces, the eyepiece tends to center itself within the quick release adapter mechanism 10.

Figure 5:
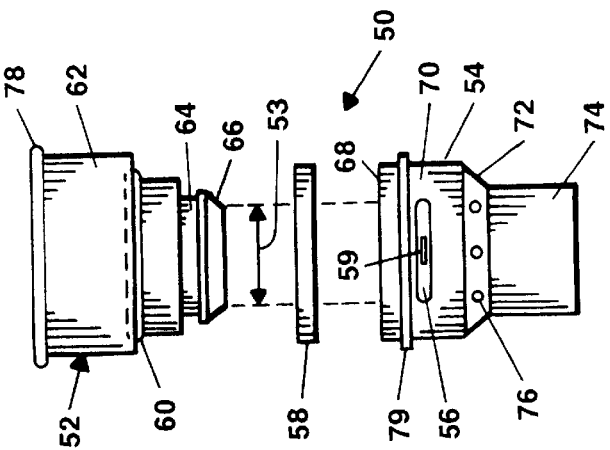
FIG. 5 is a partially exploded side view of the adapter mechanism and proximate end of an endoscope.

Referring now to FIG. 4 and FIG. 5, FIG. 5 is a partially exploded view of the adapter mechanism 10 showing a side view of the back plate 12 and the proximate end of the endoscope 40. The chamber 17 which encloses the C-clip retainer 14 is shown with the lever 16 portion of the C-clip protruding from an opening in the top of the chamber 17. A rear section 15 of the back plate 12 has an opening 19 for attaching the adapter mechanism 12 to a device such as the imaging coupler 32 shown in FIG. 4. The fixed post 18 is shown protruding from the side of the rear section 15. Eight holes 21 (0.125 in.) are equally positioned every 45 degrees around a circle surrounding the opening 19 in which the imaging coupler 32 is attached. The holes 21 provide for air venting of the eyepiece 30. The material of the adapter mechanism 10 is composed of machinable or moldable, thermally stable lightweight material. For endoscopes 40 the material must additionally be colorfast and chemically inert. The back plate 12 in the present embodiment is made of aluminum; it may also be made of stainless steel or rigid plastic.

Figure 6:
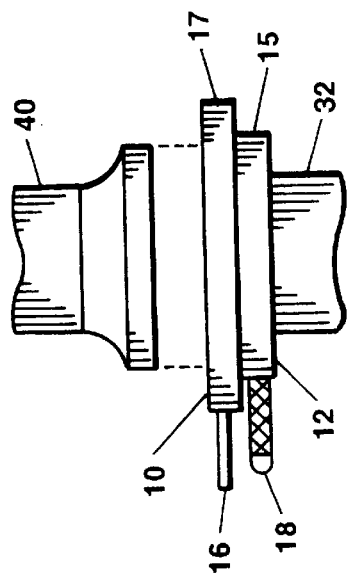
FIG. 6 is a partially exploded view of an alternate embodiment of a quick attach/release apparatus.

Referring now to FIG. 6, a partially exploded view of an alternate embodiment of a quick release apparatus 50 is shown having an open cylindrical portion 53. The quick release apparatus 50 comprises an upper section 52 and a lower section 54. The lower section 54 includes an opening 56 having a lever 59 protruding through it which when moved sideways causes the upper section 52 to be quickly released from the lower section 54. An O-ring 60 provides for a tight fitting when the upper section 52 is attached to the lower section 54. C-clip 58 is installed into lower section 34 so that the lever 59 of C-clip 58 is protruding out from a side slot 56 in the lower section 54. C-clip 58 is a smaller version of C-clip 14 in FIG. 2 and is captured in a circumferential cylindrical chamber 70 in a similar manner as C-clip 14. The upper section 52 is a custom connection designed to fit into lower section 54. The taper 66 on the end of upper section 52 expands the C-clip 58 when installed into lower section 54. Then the C-clip 58 falls into a circular chamber 64 connecting lower section 54 with upper section 52. The joined lower section 54 and upper section 52 can only be disassembled when the lever 59 on C-clip 58 is moved sideways opening the C-clip 58. O-ring 60 provides a tight fit and sealing properties between upper section 52 and lower section 54.

Still referring to FIG. 6, the lower cylindrical end 74 of lower section 54 can be configured to mount to any appropriate in-line components. The lower cylindrical end 74 of the embodiment shown in FIG. 6 comprises a smaller diameter portion adjacent to the holes 76 and then the lower cylindrical end 74 expands approximately at the midpoint to a larger diameter portion with the outside diameter remaining the same for the smaller diameter portion and the larger diameter portion each of which is threaded for screwing into mating devices. The lower cylindrical end 74 of the embodiment shown in FIG. 6 comprises a threaded inside diameter (not shown). A tapered portion 72 of lower section 54 comprises 8 holes 76 spaced 45 degrees apart for providing venting for eyepiece applications. The quick release apparatus 50 enables the coupling together of two optical components attached to the end of each section 52 and 54. This quick release apparatus 50 has applications other than for the eyepiece 30; for example, it may be used for electrical signal connection or for connecting lines carrying gas or liquid, in which case the holes 76 would be eliminated. The quick release apparatus 50 is made of aluminum, but it may also be made of stainless steel or rigid plastic.

Referring now to FIG. 7, a partially exploded side view of an endoscope 40 seated in one end of an eyepiece 30 by means of the quick attach/release mechanism 10 with the other end of the eyepiece 30 attached to one section 52 of the alternate embodiment quick release apparatus 50. The lower section 54 of the quick release apparatus 50 may be coupled to a device such as a camera lens 64.

Figure 8:
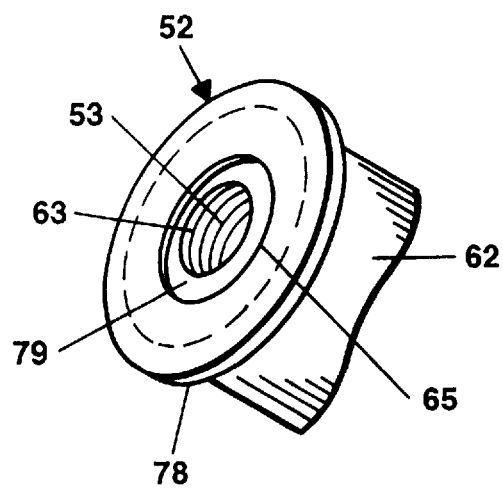
FIG. 8 is a top view of a lower section of the alternate embodiment of a quick attach/release apparatus showing a C-clip positioned within the wall of the lower section and a lever portion of the C-clip protruding through an opening in a cylindrical wall.

Referring to FIG. 8, a perspective view of the upper section 52 of the alternate embodiment shows the open cylindrical center portion having threads 63 on a narrower inner portion 53 of the cylindrical surface contiguous to a wider inner portion 65 of the cylinder near the top of the hollow upper section 52.

Figure 9:
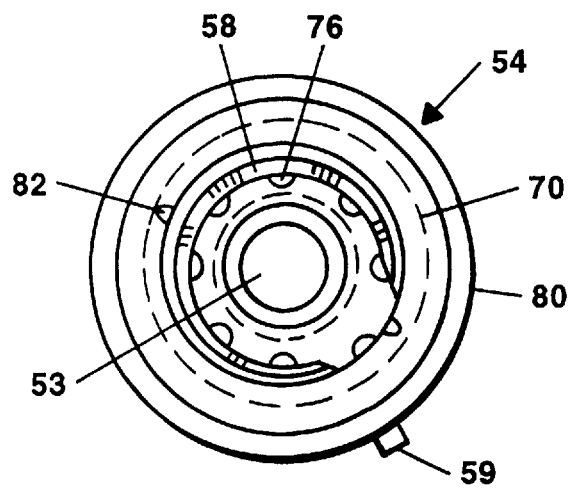
FIG. 9 is a partially exploded side view of an endoscope seated in a quick release eyepiece apparatus with the other end of the eyepiece being attached to the quick release alternate embodiment which attaches to a camera lens.

Referring to FIG. 9, a top view of the lower section 54 of the alternate embodiment is shown. The C-clip 58 is partially extending outside of its cylindrical groove in the cylindrical wall. The lever 59 of the C-clip 58 extends through the side wall of lower section 54. A rib 80 around the perimeter of the device provides for gripping the lower section 54 of the quick release apparatus 53. The open cylindrical center portion 53 continues through the lower section 54.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the united states is:

1. An adapter mechanism for enabling an image transmitted along an optical axis from a first device to be received by a second device, said adapter mechanism comprising:

back plate having a first end portion which is securable to said second device, and a second end portion spaced along an adapter mechanism axis for attaching to said first device;

said back plate including at said second end portion a radially extending cylindrical chamber;

retaining means positioned within said cylindrical chamber for securing said first device within said back plate;

said retaining means having a lever extending through an outer wall of said cylindrical chamber for enabling said first device to be released from said adapter mechanism; and said back plate comprises a guide post and said retaining means comprises a slot for receiving said guide post into said slot, thereby limiting the radial movement of said retaining means when said lever is moved in a direction to release said first device.

2. The adapter mechanism as recited in claim 1 wherein said retaining means comprises a circular ring having said lever at a first end and a hook at a second end for securing said retaining means within said cylindrical chamber.

3. The adapter mechanism as recited in claim 2 wherein said retaining means comprises a C-clip having a chamfered edge for enabling said first device to snap into said adapter mechanism.

4. The adapter mechanism as recited in claim wherein said back plate comprises a rear section having a radially extending cylindrical section of lesser radial distance than said cylindrical chamber, said rear section having a fixed post protruding away from said cylindrical section and positioned a predetermined distance from said lever to enable said first device to be quickly released from said adapter mechanism using the fingers of one hand.

5. The adapter mechanism as recited in claim 3 wherein said C-clip extends through an arc of approximately 350 degrees.

6. The adapter mechanism as recited in claim 1 wherein said retaining means comprises material for providing an elastic force to grip an interfacing device inserted in said adapter mechanism.

7. The adapter mechanism as recited in claim 6 wherein said material comprises acetal compounds such as delrin material.

8. The adapter mechanism as recited in claim 1 wherein said second end portion comprises a rear section having an opening for attaching to said second device and enabling passage of said image.

9. The adapter mechanism as recited in claim 8 wherein said rear section of said second end portion comprises a plurality of holes surrounding said opening for air venting.

10. A method of attaching a first device to a second device with a quick attach/release mechanism for enabling an image transmitted from said first device along an optical axis to said second device, comprising the steps of:

provviding a back plate of said quick attach/release mechanism having a first end portion which is securable to said second device and a second end portion spaced along an adapter axis to said first device;

providing at said second end portion of said back plate a radially extending cylindrical chamber for receiving said first device;

positioning retaining means within said cylindrical chamber for securing said first device within said back plate;

extending a lever through said cylindrical chamber to enable said first device to be quickly released from said mechanism;

providing a guide post within said back plate; and receiving said guide Post into a slot in said retaining means, thereby limiting the radial movement of said retaining means as said lever is moved in a direction to release said first device.

11. The method as recited in claim 10 wherein said step of said retaining means being positioned within said cylindrical chamber comprises the step of providing a C-clip having said lever at a first end of said C-clip and a hook at a second end of said C-clip.

12. The method as recited in claim 11 wherein said step of providing said C-clip further comprises the step of providing a chamfered edge on said C-clip for enabling said first device to snap into said adapter mechanism.

\* \* \* \* \*